Feb. 13, 1968  T. H. TERRY ET AL  3,368,638

TANDEM AXLE CHANGE SPEED CONTROL SYSTEM

Filed Aug. 4, 1965  3 Sheets-Sheet 1

INVENTORS
THOMAS H TERRY
GEORGE L. MOLDOVAN
BY
Hoffmann and Yount
ATTORNEYS

Feb. 13, 1968     T. H. TERRY ETAL     3,368,638
TANDEM AXLE CHANGE SPEED CONTROL SYSTEM
Filed Aug. 4, 1965                     3 Sheets-Sheet 2

INVENTORS
THOMAS H TERRY
BY GEORGE L. MOLDOVAN
Hoffmann and Yount
ATTORNEYS

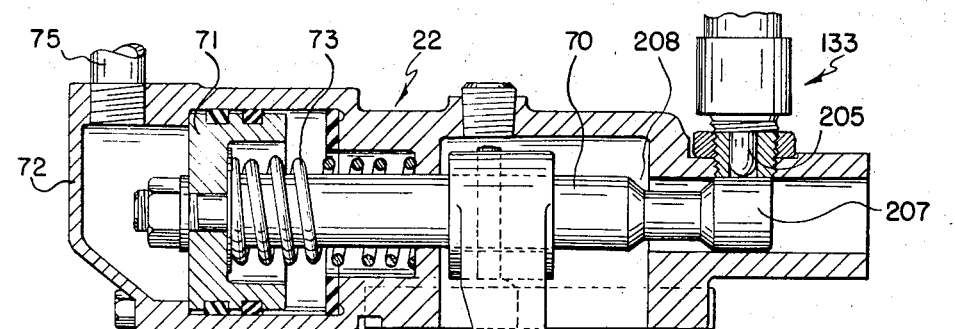
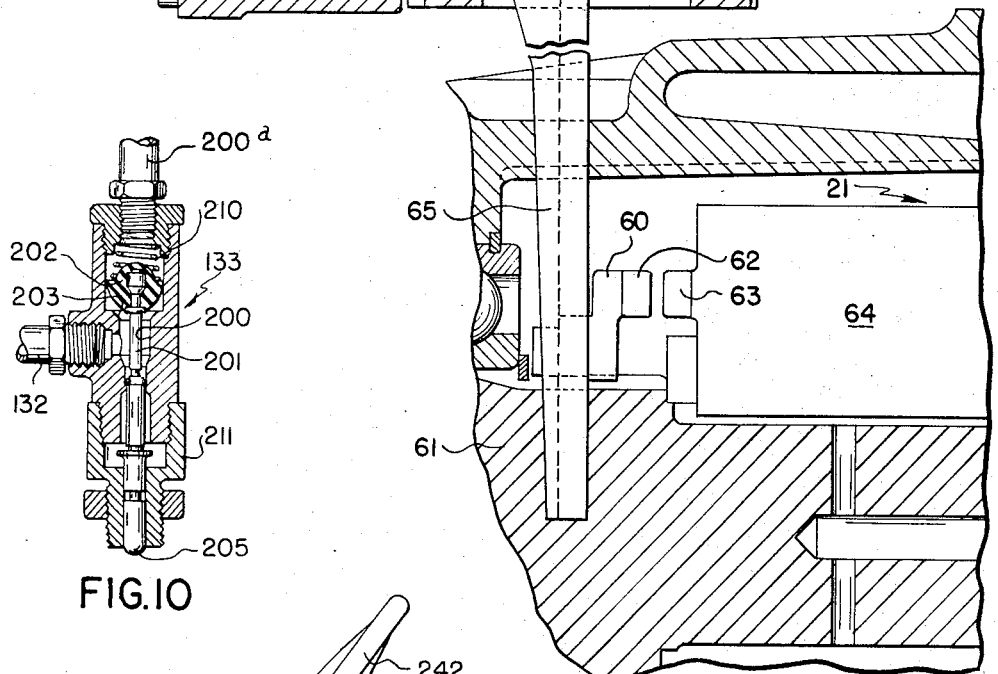
FIG.9
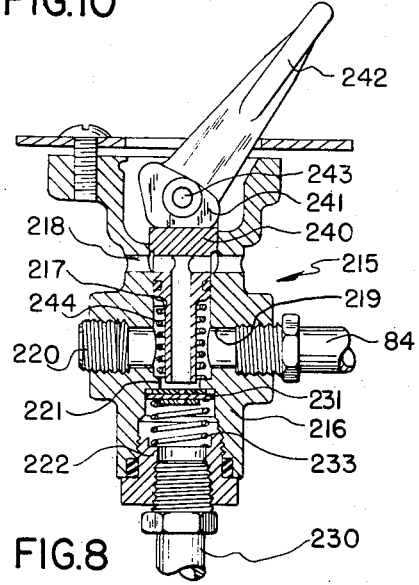
FIG.10
FIG.8
INVENTORS
THOMAS H TERRY
BY GEORGE L. MOLDOVAN
Hoffmann and Yount
ATTORNEYS

United States Patent Office 3,368,638
Patented Feb. 13, 1968

3,368,638
TANDEM AXLE CHANGE SPEED
CONTROL SYSTEM
Thomas H. Terry, Bay Village, and George L. Moldovan,
Willowick, Ohio, assignors to Eaton Yale & Towne Inc.,
a corporation of Ohio
Continuation-in-part of application Ser. No. 415,431,
Dec. 2, 1964. This application Aug. 4, 1965, Ser.
No. 477,167
10 Claims. (Cl. 180—22)

ABSTRACT OF THE DISCLOSURE

A drive mechanism comprises a pair of driving axles, each of which includes a change speed mechanism actuatable to vary the output speed of the axle. Shift means is associated with each of the change speed mechanisms and is operable to actuate the change speed mechanism to vary the output speed of the corresponding axle. An interaxle differential is drivingly connected between the driving axles and is operable to provide a differentiating action therebetween, and the interaxle differential has an interaxle differential lockout mechanism associated therewith. A control system is provided which is operable to selectively operate the shift means associated with the change speed mechanisms only after the interaxle differential lockout mechanism is deactuated.

---

This application is a continuation-in-part of copending application Ser. No. 415,431, filed Dec. 2, 1964.

The present invention relates to a multispeed axle drive and, particularly, relates to a multispeed axle drive including a pair of driving axles each having a power mechanism for shifting the respective driving axles to vary the output speed thereof.

Tandem axle drives including a pair of driving axles having an interaxle differential connected therebetween so that the two driving axles may be driven at different speed ratios are known. Each of such driving axles incorporate a power shifting mechanism for shifting the respective driving axle between a high and low speed condition so as to vary the output speed thereof. Moreover, such tandem axle drives incorporate an interaxle differential lock-out mechanism which, when actuated, renders the interaxle differential inoperable so that the driving axles are driven in a fixed speed ratio. The interaxle differential lock-out mechanism cannot be actuated until both axles are in their low speed condition. Such a tandem axle drive is disclosed in the aforementioned application and in United States Patent No. 3,146,842.

It is important in tandem axle drives of the above-noted type to ensure the interaxle differential is not locked out when the axle drives are shifted. In the known tandem axle drives, the shifting of the axle drives will, all too frequently, occur before the interaxle differential is rendered effective, that is before the interaxle lock-out mechanism is disengaged. This causes a grinding of gears and excessive wear thereof and is highly detrimental to the operation and life of the axle drive.

Accordingly, the principal object of the present invention is the provision of a new and improved multispeed axle drive including a pair of driving axles, at least one of which includes a shifting mechanism actuatable to vary the output speed, thereof, and which are connected by an interaxle differential having a lock-out mechanism associated therewith, and wherein the shifting mechanism is positively prevented from operating until the interaxle differential lock-out mechanism is disengaged thereby rendering the interaxle differential operable.

A still further object of the present invention is the provision of a new and improved multispeed axle drive, as noted above, wherein the shifting mechanism is actuated in response to the interaxle differential lock-out mechanism being disengaged so as to render the interaxle differential operable.

Still another object of the present invention is the provision of a new and improved tandem axle drive including a pair of driving axles, both of which include a shifting mechanism actuatable to shift the axle with which it is associated between high and low speeds and which axles are interconnected by an interaxle differential having a lock-out mechanism engageable therewith for rendering the interaxle differential inoperable, and a fluid control system for actuating the shift mechanisms and interaxle differential lock-out mechanisms so that the shift mechanisms can be actuated only if the interaxle differential lock-out mechanism is disengaged.

A further object of the present invention is the provision of a new and improved multispeed tandem axle drive, as noted in the next preceding paragraph, wherein the fluid control system includes a valve in the fluid supply line for the shift mechanisms and which valve is opened in response to the disengagement of the interaxle differential lock-out mechanism.

Still another object of the present invention is the provision of a new and improved multispeed axle drive having a drive mechanism shiftable between high and low speeds and a shift mechanism for shifting the drive between high and low speeds and wherein the shift mechanism is air operated to shift the drive to its high-speed position while a spring biases the drive to its low-speed position, and wherein the shifting of the drive to its low-speed position by the spring is extremely rapid due to the location in the air line leading to the shift mechanism of a valve which discharges air to the ambient atmosphere at a high rate of speed to permit operation of the spring.

Further objects and advantages of the present invention will be apparent to those skilled in the art to which it relates from the following detailed description of a preferred embodiment thereof made with reference to the accompanying drawings forming a part of this specification and in which:

FIG. 8 is a sectional view of still another valve used in the system of FIG. 1;

FIG. 9 is a fragmentary sectional view of a portion of the system shown in FIG. 1; and FIG. 10 is still another sectional view of a valve used in the system of FIG. 1.

Figure 1:
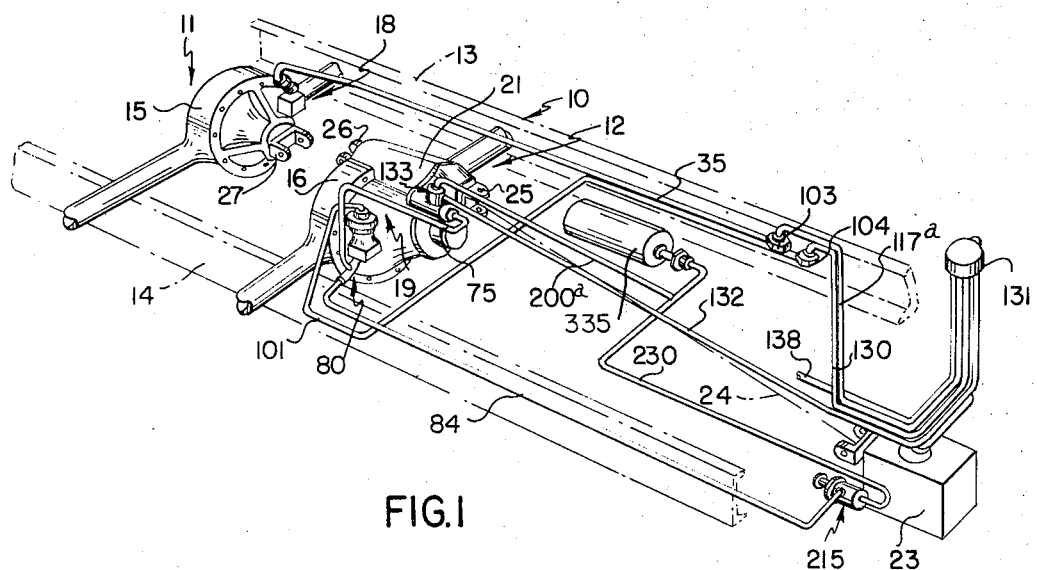
FIG. 1 is a schematic view of a portion of a vehicle embodying the present invention.

The present invention provides an improved multi-speed axle drive and, particularly, provides an improved multispeed, tandem axle drive including a pair of driving axles. Multispeed, tandem axle drives are known to include shift mechanisms for shifting each of the driving axles between high and low speeds. Such tandem driving axles are known to be connected by an interaxle differential mechanism having a differential lock-out mechanism associated therewith for rendering the interaxle differential ineffective to provide a differential action between the tandem axles. Moreover, a fluid power system is associated with such axles for actuating the shift mechanisms for shifting the axles between their high and low speed positions and also for actuating the differential lock-out mechanism to lock out the interaxle differential. All too frequently, the control systems for such axle arrangements have resulted in a shifting of one or both of the axles from their low to their high-speed position prior to the de-energization or de-actuation of the lock-out mechanism for the interaxle differential. When this occurs, there is grinding of the gears causing excessive wear thereof and thereby detrimentally affecting the operation and life of the axle mechanism. One feature of the invention is directed to the solution of this problem, by insuring that the shifting mechanisms for the driving axles may be actuated only after the interaxle differential is rendered operable by deactivation of the lock-out mechanism.

The features of the present invention are preferably embodied in a tandem axle mechanism 10 which includes rearward and forward multispeed drive axles 11 and 12 mounted by conventional means, not shown, on frame members, indicated by broken lines 13 and 14, of a vehicle. The axles 11, 12 include enlarged portions 15, 16, respectively for housing conventional differential and change speed gearing not shown, which change speed gearing is capable of providing a plurality, two in the particular embodiment shown, of gear ratios. Each of the drive axles 11, 12 includes a power shifting mechanism 18, 19 which are operable to shift the drive axles 11, 12 respectively, between high and low output speeds. An interaxle differential 21 is mounted in the enlarged portion 16 of the forward or front axle 12 and is of any conventional construction. The interaxle differential 21 has a differential lock-out mechanism 22, best shown in FIG. 9, operatively associated with the interaxle differential to render the interaxle differential 21 inoperable when the lock-out mechanism 22 is actuated.

The drive to the axle mechanism 10 is from the motor of the vehicle in which the axle mechanism is embodied and, specifically, is from the transmission 23 of the vehicle through a drive indicated by the line 24 of FIG. 1 to a universal joint member 25 which is connected to deliver power to the interaxle differential 21. The interaxle differential 21 divides the power delivered thereto between the axles 12, 11. An output universal member 26 is driven from the interaxle differential and is connected to an input universal member 27 of the rear axle 11 to provide a drive to the rear axle 11. These constructions, as generally described hereinabove, may be conventional and are substantially similar to those disclosed in the aforementioned Patent No. 3,146,842.

As noted hereinabove, the axles 11, 12 are multispeed axles and include shift mechanisms 18, 19 for shifting the respective axles between high and low speeds. The shift mechanisms 18, 19 are preferably substantially identical and hence only the shift mechanism 18 associated with the rear axle 11, will be described in detail and the same reference numerals will be used on the drawings to designate corresponding parts of the shift mechanism 19.

Figure 3:
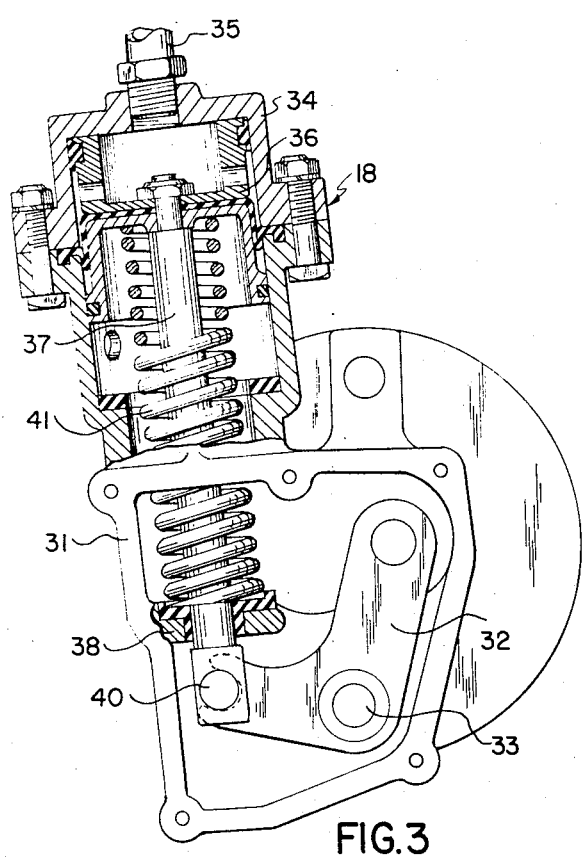
FIG. 3 is a fragmentary cross-sectional view, taken approximately along the section line 3—3 of FIG. 2.
Figure 2:
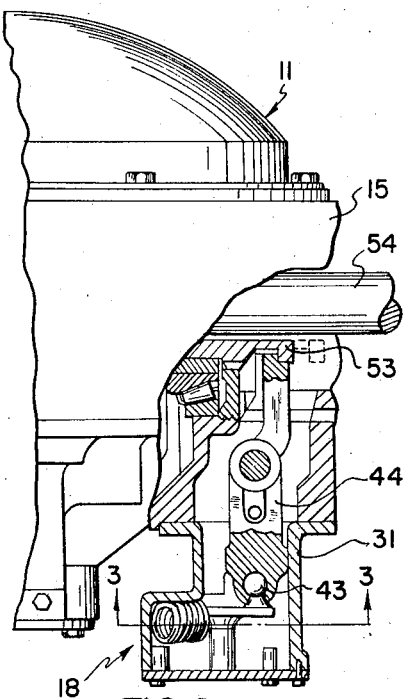
FIG. 2 is a fragmentary view of the system shown in FIG. 1, partially in section.

The shift unit 18 is of any conventional construction and is preferably air operated to effect a shifting of the axle 11 to high gear and is capable of shifting the axle to low gear upon depressurization. Such shifting between high and low speeds takes place when the torque load on the axle is below a predetermined value. The shift unit 18 is best shown in FIGS. 2 and 3 and includes a housing 31 which is fixed to the enlarged portion 15 of the axle 11. A generally L-shaped bellcrank 32 is mounted on a substantially horizontal and central pivot 33 within the housing 31. A pressure fluid cylinder 34 extends substantially upwardly from the crank housing 31 and is connected at its upper end to a fluid conduit 35. A piston member 36 is reciprocable in the cylinder 34 and includes seal means for preventing fluid leakage therepast. A connecting rod 37 is connected to the piston 36 and extends therefrom through a fixed guide 38. The lower end of the connecting rod 37 includes a pin 40 which is pivotally and slidably received in a groove in the left end of the bell crank 32, as viewed in FIG. 3. A compression spring 41 is coaxially disposed on the connecting rod 37 between the guide 38 and piston 36 and urges the piston upwardly, as viewed in FIG. 3, toward the upper end of the cylinder 34. From the above, it should be apparent that the piston 36 is biased in an upward direction by the spring 41, but when fluid pressure of a sufficient magnitude is delivered through the conduit 35 into the cylinder 34, the piston member 36 will move downwardly therein, as viewed in FIG. 3, and thereby cause pivoting movement of the bell crank 32.

The bell crank 32, when moved, effects shifting of the axle drive in a well-known manner. The end of the bell crank member 32 not connected to the connecting rod 37 carries an actuator knob 43 connected with a pivoted lever member 44. The lever member 44, extends inwardly of the housing 15 and is engageable with a sleeve member 53. Upon pivoting movement of the lever 44, the sleeve member 53 moves axially along a shaft portion 54 of the axle 11. The movement of the sleeve member 53 effects a shifting of the output speed of the axle in a well-known manner and, specifically, certain teeth elements on the sleeve member 54 cooperate with teeth elements on certain portions of the axle mechanism to provide a high and low output speed of the axle in different positions of the sleeve 53, as indicated in the aforementioned Patent No. 3,146,842.

The sleeve 53 is biased by the spring 41 to its low-speed position and is moved to its high-speed position upon actuation of the shifting mechanism causing a fluid pressure to be delivered to the cylinder 34. Any shifting of the sleeve member 53 will take place only when the torque loading on the sleeve member is reduced below a predetermined level. If such torque loading is above the predetermined level, the piston 36 will not move in response to pressurization in the line 35. If the torque loading is below the predetermined level, the sleeve member 53 is moved to its high-speed position. Moreover, upon release of the pressure above the piston member 36, the spring 41 will not move the piston member 36 vertically until the torque is below the level which may be overcome by the spring 41.

The interaxle differential lock-out mechanism 22 is, like the shifting mechanisms 18, 19, actuated by a fluid pressure. As best shown in FIG. 9, the interaxle differential lock-out mechanism 22 is similar to that disclosed in the aforementioned Patent No. 3,146,842 and reference may be made thereto for a specific description thereof. In general, the differential lock-out mechanism 22 includes a sleeve member 60 supported on an input shaft 61 which delivers power to the interaxle differential 21. The sleeve member 60 is slidable on the shaft 61 and is splined thereto and has laterally projecting teeth 62 to engage with teeth 63 on a gear 64 forming a part of the interaxle differential 21. When the teeth 62 intermesh with the teeth 63 of the interaxle differential, the drive of the input shaft 61 is directed to the interaxle differential and renders the interaxle differential inoperable to provide a differentiating action and thus the forward and rear axles are driven in a fixed drive ratio and the interaxle differential is locked out.

The sleeve member 60 is moved between its lock-out and nonlock-out positions by a connecting yoke member 65 which is connected with the sleeve member 60 and extends outwardly therefrom. The outer end of the member 65 is fixedly connected with a piston rod member 70 intermediate its ends. The piston rod member 70 at one end thereof carries a piston member 71 which is slidable in cylinder 72. The piston member 71 is biased by a spring 73 to a position wherein the sleeve member 60 is disengaged from the interaxle differential gear 64 thereby rendering the interaxle differential operable. However, upon fluid pressure being delivered to the cylinder member 72, the fluid pressure will cause movement of the piston rod 70 to the right, as viewed in FIG. 9, and movement of the member 65 into a position wherein the sleeve 60 is in locking engagement with the gear member 64, thereby locking out the interaxle differential. Fluid pressure is delivered to the cylinder 72 by a fluid conduit 75.

The axle mechanism is constructed so that the differential lock-out may be actuated only when the axles are in their low speed positions. To this end, a valve mechanism, generally designated 80, is associated with one of the shifting units 18 or 19 and is operable to sense that the shifting unit has operated to shift that particular axle to its low speed position and is opened when the shifting unit has shifted the axle to its low speed position. The valve 80 controls the flow of fluid through conduit 75 to the cylinder 72 and thus no fluid will be delivered to the cylinder 72 to actuate the lock-out mechanism until the valve 80 has opened and since the valve 80 does not open until the shifting mechanism has shifted the axle to its low speed position, the interaxle differential lock-out mechanism 22 may not be actuated until the axles have been shifted to their low speed positions.

Figure 4:
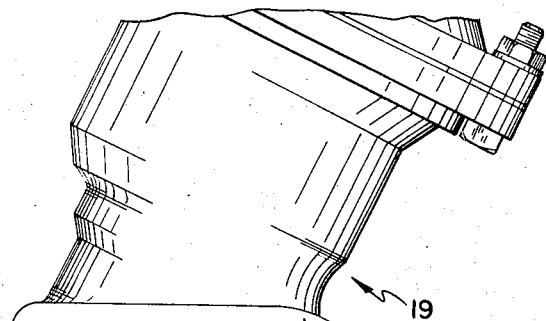
FIG. 4 is a fragmentary view of a portion of the system of FIG. 1, partially in section.

The valve 80 is illustrated in the FIG. 4 as associated with the forward shifting unit 19. The valve 80 includes a housing 82 which is fixed to and extends from the shift unit housing substantially radially of a projection 33a of the pivot shaft 33 of the unit 19. A central opening 83 extends longitudinally through the housing 82 and communicates at its outer end with a supply conduit 84. A resilient ball 87 is mounted on the outer or leftward end, as shown in FIG. 4, of a spindle 88 which is slidably disposed in the central opening 83. A spring 89 urges the ball 87 inwardly toward the housing of the shift unit 19 and against a suitable seat 90 in the central opening 83. The ball 87 when in engagement with the seat 90 prevents fluid flow through the valve from the inlet conduit 84 to the outlet conduit 75 and when out of engagement with the seat 90, flow may freely occur between the supply conduit 84 and the outlet conduit 75.

The central opening 83 has a radially reduced portion 92 located to the right of the conduit 75, as indicated in FIG. 4. The reduced portion 92 of the central opening is engaged by an O-ring 93 on the spindle 88 when the spindle 88 is in its position shown in FIG. 4 to prevent air from the conduits 84 and 75 from flowing therepast. The O-ring 93 and the portion 92 of the central opening 83 define closable parts of a venting valve and when the ball 87 is contact with the seat 90, the O-ring 93 is positioned to the right of the reduced portion 92, thereby permitting flow of fluid therepast. In this manner, when the ball 87 is in engagement with the valve seat 90, the outlet conduit 75 is vented to the atmosphere through the reduced portion 92 of the central opening 83, past the seal 93 and through a vent opening 95 to the atmosphere. Thus, it can be seen that when the ball 87 is in engagement with the valve seat 90, the cylinder 72 will be vented, thereby rendering the interaxle differential lock-out mechanism inoperable. However, when the ball 87 is not in engagement with the seat 90, the differential lock-out mechanism 22 may be actuated.

The ball 87 is moved into and out of engagement with the valve seat 90 in response to actuation of the shifting mechanism 19. The shifting mechanism 19 includes a cam 100 fixed to the pivot shaft 33a thereof for rotation therewith. The position of the cam 100, shown in FIG. 4, corresponds to the low gear position of the forward axle. In this position, the cam 100 displaces the inner end of the spindle 88 to unseat the ball 87 and thereby connect the conduit 84 to the conduit 75. Thus, in the low gear position, the differential lock-out mechanism may be actuated; on the other hand, when the pivot shaft 33a is rotated in a counterclockwise direction to shift the axle 12 to its high gear position, the cam 100 does not engage the spindle 88 and the spring 89 moves the spindle 88 and ball 87 inwardly to seat the ball against the valve seat 90 and at the same time, the pressure in the conduit 75 is exhausted.

Figure 7:
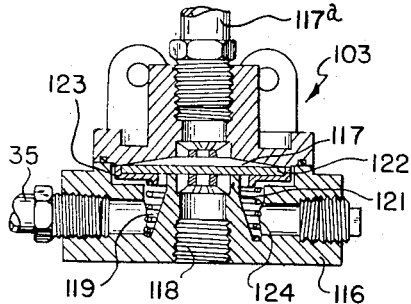
FIG. 7 is a sectional view of another valve used in the system of FIG. 1.

As noted hereinabove, the shift mechanisms 18, 19 are actuatable by fluid pressure to shift the respective axles with which they are associated. The shift mechanism 18, as described hereinabove, is actuated by fluid pressure being delivered there through a fluid pressure line 35. The shifting unit 19 is actuated by fluid pressure being delivered thereto through a supply conduit 101, see FIG. 1. The supply conduits 35, 101 are connected with valves 103, 104, respectively. These valves 103, 104 are quick-release valves and are preferably identical. The valves 103, 104 may be of any desired construction capable of exhausting the lines 35, 101, respectively, in the event that the pressure delivered to the valves is reduced. FIG. 7 discloses, for purposes of illustration only, a particular type of quick-release valve 103 which may be used in the embodiment of the invention shown in FIG. 1.

The valve 103 shown in FIG. 7 includes a housing 116 containing a flat circular chamber 117. The chamber 117 communicates at its center upwardly with a conduit 117a, and downwardly with an exhaust opening 118 which exhausts either directly or through suitable conduit means, not shown, to the atmosphere. An annular recess 119 also communicates with the conduit 35. A flexible disc 122 of a diameter slightly less than the chamber 117 is located in the chamber 117 and normally seats on an annular shoulder 121 to seal the exhaust opening 118. In the absence of an air pressure differential between the conduits 117a and 135, the edge of the disc 122 is held against the ceiling of the chamber 117 to prevent communication between the conduits 117a, 35 by an annular retainer 123 backed by a cylindrical spiral compression spring 124 disposed in the annular recess 119. Pressurization of the conduit 117a forces the disc 122 downwardly away from the ceiling of the chamber 117, thereby connecting the conduits 117a and 35. Conversely, a drop in the pressure in the conduit 117a causes the center of the disc 122 to move upwardly away from the shoulder 121 merely connecting the conduit 35 with the exhaust opening 118. Thus, the valve 103 allows substantially free air flow therethrough for pressurizing the shift unit 18 with which is is associated from the conduit 117a and allows the shift unit 18 to exhaust at a high rate without having to do so through the conduit 117a, thereby greatly cutting the time required to exhaust the shift unit.

The valves 103, 104, moreover, increase the speed of venting of the shift units by venting the units at a rapid rate. The valves 103, 104 provide for venting when there is a slight pressure differential of above about one-half to two p.s.i. between the inlet and outlet thereof, and these valves are capable of discharging from 5 to 70 cubic inches of air to the ambient atmosphere with the air pressure before venting being within the range of 40 p.s.i. and 120 p.s.i. In the preferred embodiment of the present invention, the valves 103, 104 discharge between 30 to 60 cubic inches of air between 40 to 120 p.s.i. within $2/10$ of a minute, thus each of the shift mechanisms may be vented within $2/10$ of a minute after the pressure in the supply line leading thereto is reduced. This provides for extremely high speed operation.

Fluid pressure is supplied to the valves 103, 104 by inlet conduits 117a, 130, respectively. The conduits 117a and 130 are connected to a selector valve 131 which, in turn, is connected by a supply conduit 132 to a control valve 133 adjacent the interaxle differential lock-out mechanism 22 and the valve 133 is connected by a conduit 200a to a supply tank 335. The valve 133 controls the flow of fluid to the selector valve 131 and the selector valve 131 is actuated to control the actuation of the shift units 18, 19.

The selector valve 131 includes a stepped substantially cylindrical body 132' having a radially enlarged head 133' with an inlet opening 134 which communicates with the conduit 132, a forward axle opening 135 communicating with the conduit 130, a rearward axle opening 136 communicating with the conduit 117a, and an exhaust opening 137 communicating with an exhaust conduit 138 spaced circumferentially from each other and extending axially through the head 133' from an annular recess 140 in the upper face of the head 133'.

A substantially wedge-shaped well 140 extends radially across the recess 141 and is circumferentially disposed between the inlet and exhaust openings 134 and 137 and opposite the openings 135, 136. The peripheral wall 142 of the well 141 has an upper edge 143 which is of reduced height intermediate the circumferential ends of the well 141. Detent grooves 144, 145, 146 are spaced along the inner surface of the peripheral wall 142 at locations corresponding to the spacing of adjacent ones of the openings 134, 135, 136.

A valve plate 151 is normally pivotally received within the recess 140, and has a central opening 152 snugly slidable over the central post 153 defined in the head 133' by the annular recess 140. An exhaust aperture 156, a valve aperture 157 and a further aperture 158 are circumferentially elongated and are circumferentially arranged in the plate 151. A resilient seal, such as a rubber O-ring 161, at least slightly thicker than the depth of the recess 140, normally lies in the valve aperture 157 and is maintained in substantially continuous contact with the peripheral wall of said aperture 157 by a holed and recessed retaining web 162. A rectangular slot 166 extends radially into the plate 151 between the apertures 156, 158. Integral rectangular walls 167 depend continuously from the edges of the slot 166 and extend downwardly into the well 140 to limit the range of pivotal motion of the plate 151 with respect to the head 133'.

Figures 5, 6C:
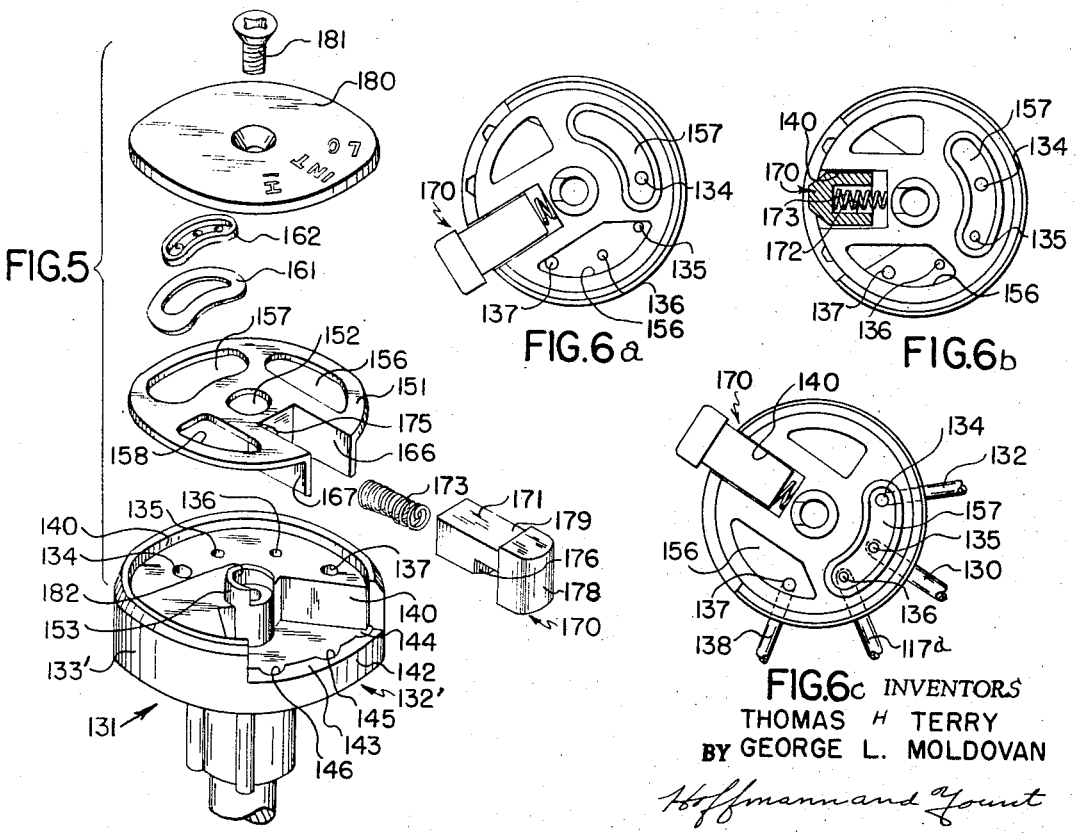
FIG. 5 is an exploded view of a valve used in the system of FIG. 1.

An actuating handle 170 includes a substantially rectangular body 171 which is snugly slidable between the walls 167. An inwardly facing opening 172 (FIG. 6b) in the body 171 receives the outer end of a cylindrical spiral compression spring 173. The spring 173 extends into the slot 166 and bears against the innermost one of the walls 167, the spring being located thereon by a suitable stud 175 (FIG. 5). The spring 173 urges the outer end 176 of the body 171 outwardly and when the body is aligned with one of the detent grooves 144, 145, or 146, the spring urges the body thereinto. The vertical edges of the outer end 176 of the body 171 are chamfered for allowing the handle 170 to be moved radially from one detent groove to another. A manually actuatable thumb button 178 is spaced outwardly from the body 171 and peripheral wall 142 by an integral bridge 179 which passes above the upper edge 143 of the peripheral wall 142 and is connected to the body 170.

Figures 6A, 6B:
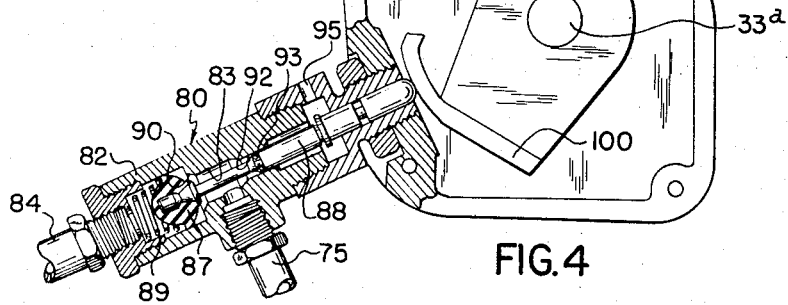
FIGS. 6a, 6b and 6c are top elevational views of the valve shown in FIG. 5, showing different operative positions thereof.

A cover disc 180 is fixed by a screw 181 atop the body 132 for closing the top of the recess 140. The disc 180 is preferably fixed against circumferential movement on the body 132 by a suitable depending integral key, not shown, which engages a slot 182 in the post 153. The cover disc 180 has suitable indicia here designations "Lo," "Int" and "Hi," located above the detent grooves 144, 145, 146, respectively, for indicating to the vehicle operator the axle assembly gear condition selected by the actuating handle 170. To select the axle assembly low gear condition, the actuating handle 170 is engaged in the detent groove 144 (FIG. 6a). In such position, the valve aperture 157 communicates only with the supply opening 134 and the forward and rearward axle openings 135, 136 are vented to the exhaust opening 137 by the exhaust aperture 156.

A clockwise rotation of the actuating handle 170 to the next or intermediate detent groove 145 (FIG. 6b) places the valve aperture 157 in communication with the supply opening 134 and forward axle opening 135 while the exhaust aperture 156 communicates with the exhaust opening 137 and rearward axle opening 136. Further clockwise rotation of the handle 170 into the detent 148 (FIG. 6c) corresponding to the axle assembly high gear condition places valve aperture 157 in communication with the supply openings 134 and both of the axle openings 135, 136 and places the exhaust aperture 156 in communication with the exhaust opening 137.

The openings 135, 136, 137 communicate as indicated in FIG. 6c with respective conduits 130, 117a, 138, which with the aforementioned supply conduit 132 are preferably of a suitable pressure-resistant and flexible material, such as nylon tubing. The conduits preferably extend downwardly from the selector valve 131 along the shift lever (FIG. 1) and may be held thereto by any convenient harness, not shown. If desired, the shift lever may comprise a hollow tube and the conduits may be enclosed therewithin to exit therefrom near or under the floor of the vehicle cab. The exhaust conduit 138 may be terminated at any convenient point and may simply be exhausted to the atmosphere when the pressure fluid used in the system is air.

As noted hereinabove, the fluid pressure is supplied by the conduit 132 to the valve 131 and when the valve 131 is actuated, it causes the shifting mechanisms 18, 19 to be charged for actuation. The shifting mechanisms 18, 19, of course, will shift the axles when the torque being transmitted thereby is reduced to a predetermined level. In accordance with the present invention, it is desirable to ensure that no shifting of the axles occurs until the differential lock-out mechanism 22 has been rendered ineffective. To this end, the fluid flow to the selector valve 131 is controlled so that no flow to the selector valve 131 will occur until the differential lock-out mechanism is released. The valve 133 which controls the supply of fluid to the selector valve 131 is operated in response to the condition of the lock-out mechanism. The valve 133 is opened to provide fluid flow to the selector valve 131 when the differential lock-out mechanism is de-actuated, and the valve 133 is closed when the lock-out mechanism is actuated.

The specific construction of the valve 133 is shown in FIG. 10 and the valve, as shown in FIG. 10, is identical to the valve 80 described hereinabove, and the valve 133 in view of this similarity will not be described in great detail. The valve 133, of course, has a passageway 200 therethrough which is connected to an inlet conduit 200a and the passageway 200 is also connected with the conduit 132 leading to the selector valve 131. A spindle member 201 carries a ball member 202 which is movable into and out of engagement with a valve seat 203 to control the flow of fluid from the conduit 200a to the conduit 132. The ball member is moved to its open position shown in FIG. 10 upon movement of a spindle member 204 on which the ball member 202 is mounted. The outer end of the spindle member 20 is associated with an actuating portion 207 of the rod 70 of the differential lock-out mechanism 22, see FIG. 9. The portion 207 of the rod 70 engages the outer end 205 of the spindle 201 and moves the ball to an open position, as shown in FIG. 10, to provide for fluid flow through the valve 133 when the lock-out mechanism 22 is de-actuated.

When the lock-out mechanism 22 is actuated, the rod 70 moves to the right, as viewed in FIG. 9, causing the recessed portion 208 of the rod 70 to move beneath the outer end 205 of the spindle 201. In this position, a spring 210 urges the ball 202 into engagement with the valve seat 203 and blocks the flow of fluid from the supply conduit 200a to the outlet conduit 132 and thereby prevents fluid flow to the valve 131. At the same time, the conduit 132 and the selector valve 131 are vented through the vent passageway 211 in much the same manner as that described above in connection with the valve 80 when the ball is in its closed position. Thus, it can be seen that the shift mechanisms 18, 19 cannot be actuated unless the differential lock-out mechanism is de-actuated.

The lock-out mechanism 22 is actuated by operation of a valve 215. The valve 215 comprises an elongated housing 216 having a central opening 217 extending therethrough. An exhaust passageway 218 opened to the atmosphere extends preferably diametrically through the housing 216 and communicates with the central opening 217 adjacent the upper end thereof. A passage 219 extends preferably diametrically through the housing 216 and communicates with the central opening 217 at a point spaced below the exhaust passage 218. The right end of the passage 219 is connected with the conduit 84 leading to the valve 80 which, in turn, controls the actuation of the differential lock-out mechanism 22. The left end of the passageway 219 is closed by a suitable plug 220. An annular flange 221 extends radially into the central opening 217 below the transfer passage 219. An annular spring retainer 222 is threaded into the bottom end of the central opening 217 and lies spaced below the flange 221. The retainer 222 has a suitable fitting therein and communicates the central opening with a supply conduit 230 which is connected with the supply tank which communicates with conduit 200a. A valve disc 231 is disposed in the central opening 217 below the flange 221 and has a plurality of radially outwardly extending ears. A helical compression spring 233 rests on the upper face of the spring retainer 222 and extends upwardly therefrom into contact with the valve disc 231 for urging the valve disc 231 into sealing contact with the lower face of the annular flange 221 to prevent flow from conduit 84 to the conduit 230.

An elongated plunger 240 is snugly but slidably inserted into the upper end of the opening 217. The upper end of the plunger 240 engages a cam 241 on a handle member 242. The handle 242 and cam 241 are pivoted about a suitable pivot pin 243. The plunger 240 is urged into engagement with the cam 241 by a spring 244 located in the central opening 217 in the valve. The valve may be opened and closed by moving the handle 242 to cause lowering of the plunger 240. In the position illustrated in FIG. 8, the valve is closed and the conduits 84 and 230 are not communicating and the conduit 84 is vented to the atmosphere through plunger 240 and the passage 218. If the valve is actuated by movement of the handle 242, the member 231 is moved away from the flange 221 and downwardly causing the conduits 84, 230 to communicate and also, at the same time, preventing venting of the conduit 84 to the atmosphere through the passage 218.

The operation of the control system and axle mechanism described in detail hereinabove should be clear from the detailed description. The selector valve 131 may be actuated to selectively shift the axles 11, 12 to their high or low speed positions. The flow of fluid through the selector valve 131, however, is controlled by the valve 133, which valve is actuated by the interaxle differential lock-out mechanism 22. Thus, when the interaxle differential lock-out mechanism is energized, the valve 133 is closed and the selector valve 131 is inoperable to energize the shifting mechanisms 18, 19 associated with the axle mechanisms. However, when the differential lock-out mechanism is released, the axles may be shifted to their high and low speed positions. Thus, it is impossible for the control system disclosed herein to cause the shifting mechanism to operate before the differential lock-out mechanism 22 has been released and therefore shifting before the differential lock-out mechanism 22 is released is not a problem thereof.

From the above description it should be apparent that applicant has provided a new and improved axle mechanism. It should also be apparent that certain modifications, changes, and adaptations may be made in the structure of the preferred embodiment thereof and that it is hereby intended to cover all such modifications, adaptations, and constructions which fall within the scope of the appended claims.

Having described our invention, we claim:

1. A drive mechanism comprising a pair of driving axles each of said driving axles including a change-speed mechanism actuatable to vary the output speed of the axle, shift means associated with each of said change-speed mechanisms and operable to actuate said change speed mechanisms to vary the output speed of the corresponding driving axle, an interaxle differential drivingly connected between said driving axles and operable to provide a differentiating action therebetween, an interaxle differential lock-out mechanism actuatable to render said interaxle differential inoperative, and a control system operable to actuate said interaxle differential lock-out mechanism and said shift means including means responsive to de-actuation of said differential lock-out mechanism providing for actuation of said shift means.

2. A drive mechanism comprising a pair of driving axles, each of said driving axles including a change-speed mechanism actuatable to vary the output speed of the axle, fluid operated shift means associated with each of said change-speed mechanisms and operable to actuate said change-speed mechanisms to vary the output speed of the corresponding driving axle, an interaxle differential drivingly connected between said driving axles and operable to provide a differentiating action therebetween, an interaxle differential lock-out mechanism actuatable to render said interaxle differential inoperative, and a control system operable to actuate said interaxle differential lock-out mechanism including a fluid conduit connected with said shift means to provide a fluid pressure in said shift means to actuate said shift means, control means in said conduit operable to direct fluid selectively to said shift means to effect actuation thereof, a valve in said conduit and which is opened to provide a fluid pressure in said shift means only when said lock-out mechanism has been de-actuated.

3. A drive mechanism comprising a pair of driving axles, each of said driving axles including a change-speed mechanism actuatable to vary the output speed of the axle, fluid operated shift means associated with each of said change speed mechanisms and operable to actuate said change-speed mechanisms to vary the output speed of the corresponding driving axle, an interaxle differential connected between said driving axles and operable to provide a differentiating action therebetween, a fluid operated interaxle differential lock-out mechanism actuatable to render said interaxle differential inoperative, and a control system operable to actuate said interaxle differential lock-out mechanism and shift means including a first fluid conduit means connected with said shift means to provide a fluid pressure thereon, a control valve connected with said first fluid conduit means and operable to actuate said shift means, a second fluid conduit means for delivering fluid to said control valve, and a valve in said second conduit means opened in response to de-actuation of said differential lock-out mechanism and closed in response to actuation of said lock-out mechanism whereby fluid is blocked from said control valve when said differential lock-mechanism is actuated.

4. A drive mechanism as defined in claim 3 wherein said shift means comprises a pair of shift units each associated with a separate one of said driving axles, each of said shift units including a member movable under fluid pressure to shift the change-speed mechanism of the axle with which it is associated to its high speed position and means biasing the member toward its low speed position.

5. A drive mechanism as defined in claim 4 wherein said shift means are selectively actuatable by operation of said control valve, and said first fluid conduit means includes a pressure sensitive valve means for venting said shift units to effect shifting of said member to its low speed position by said biasing means.

6. A drive mechanism as defined in claim 5 wherein said pressure sensitive valve means includes a vent port and a member movable to communicate said shift units and said vent ports in response to about one-half to two p.s.i. pressure drop across the valve and wherein said valve discharges up to 70 cubic inches of fluid at 40 to 120 p.s.i. within two-tenths of a minute.

7. A drive mechanism as defined in claim 3 wherein said differential lock-out mechanism includes an actuating member movable to a first position upon de-energization and movable to a second position upon energization thereof, said valve having a valve member movable to open and closed positions in response to movement of said actuating member to its first and second positions, respectively.

8. A drive mechanism comprising a pair of axle drives, each of said axle drives includes a change-speed mechanism actuatable to vary the output speed of the axle, shift means associated with each of said change-speed mechanisms and including a member movable to shift the axle drive between high and low speeds, means biasing said member to shift said axle drive to low speed and a fluid pressure means operable to move the member to shift said axle to high speed, an interaxle differential connected between said axle drives, an interaxle lock-out mechanism actuatable to render said interaxle differential inoperative, and a control system operable to apply a fluid pressure to said fluid pressure means to overcome the bias of said means and shift said mechanisms to their high-speed positions and including a fluid supply conduit, control means in said conduit operable to direct fluid selectively to said shift means to effect actuation thereof, and a valve located in said fluid supply conduit which is opened to provide a fluid pressure for said fluid pressure means in response to de-actuation of the lock-out mechanism.

9. A drive mechanism as defined in claim 8 wherein said control system further includes a pressure sensitive valve located in said fluid system and associated with each shift means and operable to vent said fluid pressure means and said pressure sensitive valve includes a vent port and a member movable to communicate said fluid pressure means in said vent port.

10. A drive mechanism comprising an axle drive including a change-speed mechanism actuatable to vary the output speed of the axle, shift means associated with said change-speed mechanism and operable to actuate said change-speed mechanism to vary the output speed of the axle drive, said shift mechanism including means biasing said shift means so as to provide a low-speed output drive for said axle and a pressure means operable in response to air pressure to overcome said bias and shift said change-speed mechanism to a high-speed position, an air conduit means communicating with said pressure means of said shift mechanism and operable to direct air thereto, and valve means located in said air conduit means and which is opened to provide an air pressure in said pressure means and which is operable when said air pressure to said fluid pressure means is reduced to vent said pressure means at a rate of up to 70 cubic feet of air at 40 to 120 p.s.i. in two-tenths of a minute so as to provide for return of said shift mechanism under the bias of said means at an extremely rapid rate of speed.

References Cited

UNITED STATES PATENTS 3,146,842   9/1964   Nelson et al. _____ 180—22

A. HARRY LEVY, *Primary Examiner.*

UNITED STATES PATENT OFFICE
CERTIFICATE OF CORRECTION

Patent No. 3,368,638                            February 13, 1968

Thomas H. Terry et al.

It is hereby certified that error appears in the above numbered patent requiring correction and that the said Letters Patent should read as corrected below.

Column 10, line 60, for "lock-mechanism" read -- lock-out mechanism --.

Signed and sealed this 22nd day of April 1969.

(SEAL)
Attest:

Edward M. Fletcher, Jr.                          EDWARD J. BRENNER
Attesting Officer                                     Commissioner of Patents